United States Patent Office 3,644,406
Patented Feb. 22, 1972

3,644,406
WATER SOLUBLE AZOFORMATE ESTERS
Chester Stephen Sheppard, Tonawanda, and Ronald Edward MacLeay, Williamsville, N.Y., assignors to Pennwalt Corporation, Philadelphia, Pa.
No Drawing. Filed Sept. 27, 1968, Ser. No. 763,342
Int. Cl. C07c 107/00, 107/02, 107/04
U.S. Cl. 260—192                                     5 Claims

ABSTRACT OF THE DISCLOSURE

Water soluble azoformate esters of the formula

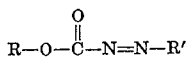

wherein at least one of R and R' contains a water solubilizing group, such as 2-hydroxyethyl t-butylazocarboxylate which are useful as polymerization initiators in aqueous medium for polymerization reactions such as vinyl monomer polymerization by the emulsion technique.

BACKGROUND OF THE INVENTION

(1) The field of the invention

The invention relates to water soluble azoformate esters which are capable of affording free radicals. Also the invention relates to processes wherein these compounds are used to afford free radicals in an aqueous medium, e.g., emulsion polymerization of vinyl monomers.

(2) Description of the prior art

Esters of azodiformic acid [ROC(O)N=NC(O)OR] are known. They have been used as dienophiles in Diels-Alder reactions, selective oxidizing agents, vulcanization agents (by allylic hydrogen additions to the azo-N=N— bonds), blowing agents for producing foamed polymers. and in various other chemical reactions. Only one reference is known wherein a polymerization initiator use is described. [E. I. Fedotova, R. Ya. Khvilivitskii, and I. I. Zmachinekaya, Uchenyl Zapiski Gor'kovsk. Univ. 1953, No. 24, 183–9; C.A. 50, 8461d (1956).] Fedotova et al. used dimethyl azodiformate (CH₃OC(O)N=NC(O)OCH₃)

to polymerize methyl methacrylate in both bulk and emulsion polymerization systems.

In bulk polymerization systems, no water is present, and the free radicals required to initiate the polymerization must be generated in the organic (monomer) medium. In emulsion polymerization systems, water is present, and the free radicals must be generated in the water medium. Since Fedotova et al., used dimethyl azodiformate in both polymerization systems, it is not obvious from their work that water soluble azoformate esters will decompose in water to liberate free radicals. Fedotova et al. teach that dimethyl azodiformate decomposes thermally at 90° to 360° C. The water soluble azo esters of the present invention are not esters of azodiformic acid [ROC(O)N=NC(O)OR] but esters of azoformic acid (R'—N=N=C(O)OR).

A Japanese patent [Japan 22743 (1963); C.A. 60, 1909h (1964)] asserts that the disodium salt of azodiformic acid [NaOC(O)N=N—C(O)ONa] is an initiator for the emulsion polymerization of chloroprene and chloroprene copolymers at a pH above 8. Sodium salts are not esters and an azodiformate was used rather than the azoformates of the present invention.

SUMMARY OF THE INVENTION

The water soluble azoformate esters of the invention have the general formula:

I.   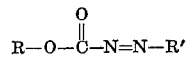

where:

(a) R is a 1–7 carbon atom hydrocarbon radical or a substituted hydrocarbon radical having not more than 7 carbon atoms, the substituent is defined in (c);

(b) R' is

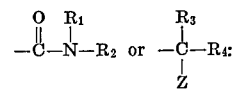

(c) at least one of R and R' contains a water solubilizing group selected from the class consisting of —OH, —SO₃M, —OSO₃M,

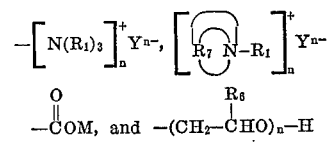

—COM, and —(CH₂—CHO)ₙ—H (d) M is alkali metal, NH₄⁺, or H⁺;
(e) Y is an n-valent inorganic acid anion;
(f) R₁ and R₂ are —H, aliphatic, cycloaliphatic or aromatic;
(g) R₃ and R₄ are aliphatic or cycloaliphatic
(h) R₅ is aliphatic, cycloaliphatic or aromatic;
(i) R₆ is hydrogen or lower alkyl;
(j) X is oxygen or sulfur;
(k) Z is —R₁, —XR₁, —CN, —XCN, —Cl, —Br, —OOH, —OOR₃, —N₃,

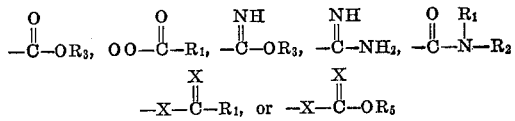

and
(l) R₇ is the remainder of a heterocyclic ring.

The invention includes a process where free radicals are generated in an aqueous medium using as the free radical affording agent a water soluble azoformate ester as defined in I.

The invention also includes a process where solid polymer is produced by polymerizing vinyl monomer in an aqueous medium using free radicals as the polymerization initiator where the free radical affording agent is a water soluble azoformate ester as defined in I.

DESCRIPTION OF THE INVENTION AND WORKING EXAMPLES

The compounds

The novel azo compounds are defined in I supra. In the formula aliphatic and cycloaliphatic are used in their broadest technical meaning; however, it is to be understood that substituents which may be present in the aliphatic or cycloaliphatic radical must be inert to the azo function, so as not to interfere with the preparation reaction. Commonly the aliphatic radical will have 1–36 carbon atoms, usually 1–22, and the cycloaliphatic radical will have 3–12 ring carbon atoms, usually 4–8, in a single ring compound and 5–24 ring carbon atoms, usually 6–12, in a doubled or fused ring radical. It is to be understood that both aliphatic and cycloaliphatic may be substituted with aromatic group(s).

Aromatic is used in its broadest technical meaning and includes a single benzenoid ring, doubled (and higher)

rings, and fused rings. These may be substituted with groups which are inert to the azo function or by one or more non-aromatic rings, including fused rings. Commonly these are phenyl, naphthyl and biphenyl radicals.

The above definitions are broad and intentionally so because the radical definitions of the compounds of Formula I do not affect the general utility of the compounds or the ability to make the compound by the processes set forth herein. Numerous compounds coming with Formula I are set out in the working examples.

A tertiary aliphatic radical is one where the free valence is associated with a carbon atom which is joined directly through its other valences with three other carbon atoms, for example, a t-butyl radical.

Lower alkyl is intended to have about 1–12 carbon atoms and usually 1–8 carbon atoms, preferably 1–6 carbon atoms.

Alkyl, alkenyl, and alkynyl: Each alkyl group may include 1 or more carbon atoms. Desirably each has 1–22 carbon atoms. Preferably each has 1–12 carbon atoms.

Cycloalkyl and cycloalkenyl: May be single ring or have two or more fused rings. Desirably the single ring has in the ring 3–12 carbon atoms, and preferably 5–8 carbon atoms. Preferably the total number of carbon atoms in the radical is 5–12. Cyclopentyl, cyclohexyl, and the radical corresponding to Decalin are preferred radicals.

Aryl: May be a single benzene ring, or a doubled or higher system, e.g. biphenyl, terphenyl, quaternaphthalene, or a fused benzene ring system, e.g. naphthalene, anthracene, phenanthrene, or an alkane bridged system, e.g., biphenylmethane, biphenylpropane. Phenyl, biphenyl, naphthalyl and the alkyl substituted radicals are preferred.

Aralkyl: The "Ar" portion of the radical may be as in "Aryl." The "alkyl" portion has desirably 1–12 carbon atoms and preferably 1–6 carbon atoms.

The preferred definitions of R's $R_1$ and $R_2$ are H, alkyl, alkenyl, aralkyl, cycloalkyl, phenyl or naphthyl.

$R_3$ and $R_4$ are alkyl, alkenyl, aralkyl or cycloalkyl.

$R_5$ is alkyl, alkenyl, aralkyl, cycloalkyl, phenyl, or naphthyl.

R is as $R_5$ except for the carbon atom limitation.

It is to be understood that the above preferred definitions include the carbon atom limitations previously set out with respect to the various R's.

Y is an inorganic anion. Anions derived from the mineral acids are preferred. Illustrative are $F^-$, $Cl^-$, $Br^-$, $HSO_4^-$, $SO_4^=$, $H_2PO_4^-$, $HPO_4^=$, $PO_4^\equiv$, $ClO_3^-$, $ClO_4^-$, $CN^-$, $NO_3^-$, $NO_2^-$, $SO_3^=$, and $CO_3^=$.

M is alkali metal. Illustrative are: Li, Na, and K.

The expression "vinyl monomer" includes all those organic compounds containing at least one $CH_2=C<$ group in their molecule. Examples of these monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adipate, methallyl propionate, allyl chloride, methallyl chloride, allyl acrylate, and methallyl methacrylate. The conjugated dienes, such as butadiene and chloroprene, are suitable.

These compounds are also effective as catalysts for the copolymerization of the above-described compounds with other types of polymerizable organic compounds, particularly those containing at least one ethylenic linkage; such as ethylene, the saturated esters of the unsaturated acids, such as diethyl maleate, dibutyl crotonate, and the like.

Using the novel azoformate esters of the present disclosure, ethyl acrylate was polymerized in emulsion systems at relatively low temperatures using short reaction cycles. (Examples V to XXI.) The emulsion polymerizations can be carried out at temperatures ranging from below 0° C. to above 90° C. Generally, the range from 0° C. to about 80° C. is preferred. The amount of azoformate ester used can vary from about 0.05 to above 2.0 phr. Generally, 0.2 to 1.0 phr. is the preferred range. The use of more than one monomer to make copolymers is also applicable.

The pH range of the emulsion polymerization is not limiting except in those instances where the azoformate ester is more soluble in water at a certain pH range than another pH range. For example, 4-(ethoxycarbonylazo)-4-cyanovaleric acid (Example I) is more water soluble at pH of 8 and above than at lower pH, while isopropoxycarbonylazo-N-[2-(2'-pyridyl)ethyl]formamide (Example II) is more water soluble in the lower pH range (i.e. below pH 7) than in the higher pH range. The emulsion polymerization results of Examples V and VI when compared to those of Examples VII–XI show that 4-(ethoxycarbonylazo)-4-cyanovaleric acid gives significantly higher polymer conversions in shorter times at pH of about 8 (sodium salt) than at pH of about 5 (free carboxylic acid). In this case the sodium salt is not only significantly more water soluble than the free acid, it is also insoluble in the monomer, being only water soluble.

The results of Example XII when compared to those of Examples XIII–XV show that isopropoxycarbonylazo-N-[2-(2'-pyridyl)ethyl]-formamide is more efficient in the acid pH range than in the basic pH range. In this case, the pyridinium salt, which is formed in the acid pH range, is significantly more water soluble than the free base used in Example XII and again it is only soluble in water and not in the monomer.

The azoformate esters of Examples III and IV on the other hand are pH independent as far as their water solubility is concerned. These products can be used in neutral emulsion polymerization systems, whereas the azoformate of Example I gives best results in the basic pH range and that of Example II gives best results in the acid pH range.

Thus, azoformate esters of general structure I can be used in any pH range in emulsion polymerizations of vinyl monomers. Optimum initiator efficiency for any specific emulsion polymerization system can be readily obtained by selection of R and R'.

In all other aspects, the conditions used for the emulsion polymerization systems (i.e. emulsifiers, water to monomer ratio, etc.) are typical of the established art.

Example XXII shows that azoformate esters without water solubilizing groups are not useful in emulsion polymerizations of vinyl monomers.

The azoformate esters of general structure I are also useful as gelling and/or curing agents for water extended resins (emulsified or dissolved in water) that are normally gelled or cured by free radical generating initiators. (Example XXIII.)

In addition to their use in emulsion polymerizations, the azoformate esters of general structure I are useful in solution polymerizations of water soluble vinyl monomers such as acrylic acid, methacrylic acid, and the like.

The novel azoformate esters of general structure I can also be used for any other applications where the generation of free radicals in water are required, such as in free-radical catalyzed chemical reactions, and also for the generation of gases (i.e. nitrogen and carbon dioxide) from an aqueous system, such as in aerosol spray applications.

Although the present disclosure is not bound by theories, it is believed that the azoformate esters are first hydrolyzed to the unstable azoformic acid which then decomposes to liberate free radicals:

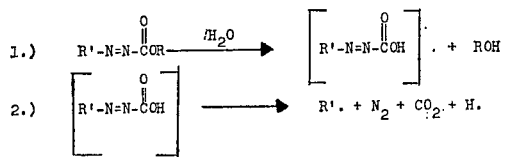

It is preferable in emulsion polymerizations that the azoformate ester be more water soluble than monomer (or oil) soluble since, if the reverse is true, the hydrolysis rate (and consequently the generation of free radicals) will be slower. However, this criterion is not always necessary. What is important is that the azoformate ester be substantially water soluble.

The major advantages of compounds of general structure I in aqueous polymerizations are the following:

(a) The azoformate esters are thermally stable compounds at ambient temperatures in the absence of water. Therefore, they can be easily shipped to fabricators without regard for refrigeration.
(b) In aqueous solution these compounds decompose at reasonable rates at room temperature thereby being capable of initiating polymerizations at room temperature or below.
(c) Since the hydrolysis occurs in the water phase, the radicals are generated completely in the water phase. This is an advantage in emulsion polymerizations over partially water soluble initiators which decompose thermally, and which also generate some of the radicals in the organic phase. This is detrimental to polymer properties in many emulsion polymerizations.

EXAMPLE I

Preparation 4-(ethoxycarbonylazo)-4-cyanovaleric acid

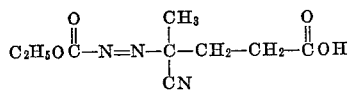

A solution of 10.2 g. (.0875 m) of levulinic acid, 10.4 g. (0.1 m) ethyl carbazate and 4.9 g. (0.1 m) sodium cyanide in 50 ml. water was stirred for 2 days at room temperature. At the end of the 2 days the solution was transferred to a 250 ml. 4-neck round bottom flask and 50 ml. methylene chloride added. The mixture was cooled to 5° C. and 8.0 g. (0.1 m) of chlorine slowly passed into the mixture; holding the temperature below 15° C. with an ice bath. The methylene chloride layer was separated, washed once with a saturated sodium chloride solution, dried over anhydrous sodium sulfate, filtered and the methylene chloride evaporated. The infrared spectrum of the resulting product was in agreement with that of the desired product. The product assayed 87.8% by an iodometric method. The yield was 83%.

EXAMPLE II

Preparation of isopropoxycarbonylazo-N-[2-(2'-pyridyl)ethyl]formamide

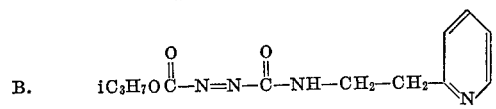

To a solution of 9.6 g. (.0475 m) of diisopropyl azodicarboxylate in 50 ml. ethanol, cooled to −5° C., was added 4.88 g. (.040 m) of 2-(2'-aminoethyl)pyridine dropwise over 15 minutes. The reaction was stirred an additional 15 minutes at 0° C. and filtered. The filtrate was poured into 100 ml. water and the resulting solution was extracted with 50 ml. pentane to remove the unreacted diisopropyl azodicarboxylic (2.45 g.). The aqueous solution was extracted with 100 ml. $CH_2Cl_2$, the $CH_2Cl_2$ solution dried, filtered and the $CH_2Cl_2$ evaporated leaving 9.9 g. of a viscous paste. The paste was slurried in 50 ml. ether, the mixture cooled to −20° C. and filtered. The filter cake weighed 2.05 g. and was azodicarbonamide. The ether filtrate was stripped to constant weight leaving a dark orange-red liquid weighing 6.55 g. (62.7% yield). The infrared spectrum of the liquid was in agreement with that of the desired product.

The pyridyl compound B above is readily converted to its inorganic acid salt. These salts have the empirical formula $$[B \cdot H]_n^+[Y]^{n-}$$

where: $n$ equals the valence of the inorganic acid anion Y. Illustrative of these salts are:

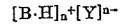

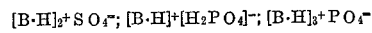

EXAMPLE III

Preparation of isoproxycarbonylazo-N-(2-hydroxyethyl)formamide

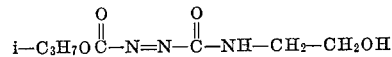

To a solution of 9.6 g. (.0475 m) of diisopropyl azodicarboxylate in 50 ml. of ethanol, cooled to −5° C., was added 3.0 g. (.049 m) of ethanolamine. Precipitation of an orange solid slowly occurred after the addition was complete. The reaction was stirred an additional 15 minutes at −5° C. and filtered. The filter cake was azobis-[N-(2-hydroxyethyl)formamide] and was discarded. The ethanol filtrate was stripped to dryness leaving 9.3 g. of a solid suspended in a liquid. This material was slurried in pentane 3 times and the pentane decanted off and discarded. This contained the unreacted diisopropyl azodicarboxylate (1.6 g.). The residue was slurried in 50 ml. methylene chloride and filtered. The filter cake weighed 0.8 g. and was more azobis-[N-(2-hydroxyethyl)formamide]. The methylene chloride solution was stripped to dryness leaving 5.2 g. (53½%) of a blood red liquid. The infrared spectrum of the product is in agreement with that of the desired product. The material is water soluble. It assayed 85% by iodometric titration.

EXAMPLE IV

Preparation of 2-hydroxyethyl t-butylazocarboxylate

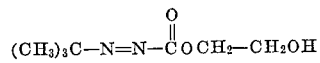

Into a 100 ml. round bottom flask was weighed 22.0 g. (.25 m) of ethylene carbonate and 27.0 g. (.25 m) of 80% t-butylhydrazine. The mixture was heated in an oil bath at 70° C. for 7 hours and allowed to cool overnight. An infrared spectrum of the material confirmed that all the ethylene carbonate had reacted and the spectrum was in agreement with the structure of 2-hydroxyethyl t-butylhydrazocarboxylate. The product weighed 47.75 g. but contained about 5 g. of water. The purity of the hydrazo was 89.5%.

Into a 100 ml. 4 neck round bottom flask was weighed 10 g. (.506 m) of the above hydrazo and 25 ml. of water and 25 ml. of methylene chloride were added. The mixture was cooled to 5° C. in an ice bath and chlorine passed into the mixture at 0.2 g./min. until 3.90 g. (.549 m) were absorbed. The reaction was stirred an additional 10 minutes, the $CH_2Cl_2$ layer separated, washed once with 10 ml. water, twice with 10 ml. 10% $NaHCO_3$ solution and once with saturated salt solution. The $CH_2Cl_2$ solution was dried over anhydrous $Na_2SO_4$, filtered, and the $CH_2Cl_2$ stripped off. The yield was 6.3 g. (75%) of a yellow liquid which assayed 87% by iodometric analysis. The infrared spectrum was in agreement with the structure of 2-hydroxyethyl t-butylazocarboxylate.

EXAMPLES V–XXIII

Emulsion polymerization of ethyl acrylate with azo esters

A mixture of 50 g. of ethyl acrylate, 40 g. water and 6 g. Triton X200 emulsifying agent was placed in a 4 neck round bottom flask equipped with a water cooled condenser, a thermometer, a self-venting addition funnel, tubing for the continuous flushing of the system with nitrogen, and a mechanical stirrer. The mixture was warmed up to the desired reaction temperature in a constant temperature bath (see Table I). The desired initiator was then weighed into 10 ml. water. [In Examples VII–XI a molar equivalent of sodium bicarbonate was added to the water to convert the 4-(ethoxycarbonylazo)-4-cyanovaleric acid to its sodium salt. In Examples XIII–XV a molar equivalent of sulfuric acid was added to the water to convert the isopropoxycarbonylazo - N - 2(2′-pyridylethyl)formamide to the pyridinium salt.] The aqueous solution of the initiator was then added to the reaction flask. The polymerization was carred out for the indicated time (Table I). Aliquots of the emulsion were taken, the water and unreacted monomer allowed to evaporate, the residue weighed and the percent conversion to poly(ethylacrylate) determined.

TABLE I

| Example | Initiator | Initiator conc. (g./100 g. monomer) | Temp., degree | Time (hrs.) | Percent conv. |
|---|---|---|---|---|---|
| V | 4-(ethoxycarbonylazo)-4-cyanovaleric acid | 1.0 | 25 | 3 | <2.5 |
| VI | do | 1.0 | 40 | 2½ | 50 |
| VII | Sodium 4-(ethoxycarbonylazo)-4-cyanovalerate | 1.0 | 25 | 2½ | 49 |
| VIII | do | 1.0 | 40 | ½ | 65 |
| IX | do | 1.0 | 50 | 1 | 74 |
| X | do | 1.0 | 50 | 3 | 95 |
| XI | do | 1.0 | 60 | ½ | 85 |
| XII | Isopropoxycarbonylazo-N-2(2′-pyridylethyl)-formamide | 1.0 | 50 | 6 | 20 |
| XIII | Isopropoxycarbonylazo-N-2(2′-pyridylethyl)-formamide hydrogen sulfate | 1.0 | 25–60 | ⅔ | 88 |
| XIV | do | 1.0 | 50 | 1½ | 75 |
| XV | do | 1.0 | 60 | ½ | 62.5 |
| XVI | Isopropoxycarbonylazo-N-(2-hydroxyethyl)-formamide | 1.0 | 25 | 3 | 42 |
| XVII | do | 1.0 | 50 | 3 | 61 |
| XVIII | 2-hydroxyethyl t-butylazocarboxylate | 1.0 | 25 | 2½ | 82 |
| XIX | do | 1.0 | 40 | 3 | 82 |
| XX | do | 1.0 | 60 | ½ | 73 |
| XXI | do | 1.0 | 60 | 3 | 88 |
| XXII | Isopropyl t-butylazocarboxylate | 1.0 | 60 | 3 | <2 |

EXAMPLE XXIII 2-hydroxyethyl t-butylazocarboxylate (from Example IV) was used to catalyze a commercial water extended resin (AROPOL WEP, an unsaturated polyester resin-styrene blend by Ashland Oil & Refining Co. formulated to be extended with water to form a water-in-oil emulsion with the formulation used in this test containing about 60% water) at 25° C. in an amount corresponding to one percent by weight of the resin. The resin completely gelled in 10 minutes. When the test was conducted at 82° C. (180° F.), the resin gelled in 5 minutes and cured in 6.3 minutes. Without the azo compound, the resin does not gel or cure at 82° C. (180° F.).

Other compounds which come within the scope of this invention are: Me=methyl; Et=ethyl; Φ=phenyl; Pr=propyl; and Bu=butyl 1.
$$iC_3H_7O\overset{O}{\underset{\|}{C}}-N=N-\overset{O}{\underset{\|}{C}}-NH-(CH_2CH_2O)_nH$$

2.
$$EtO\overset{O}{\underset{\|}{C}}-N=N-\overset{O}{\underset{\|}{C}}-N[(CH_2-CH_2O)_nH]_2$$

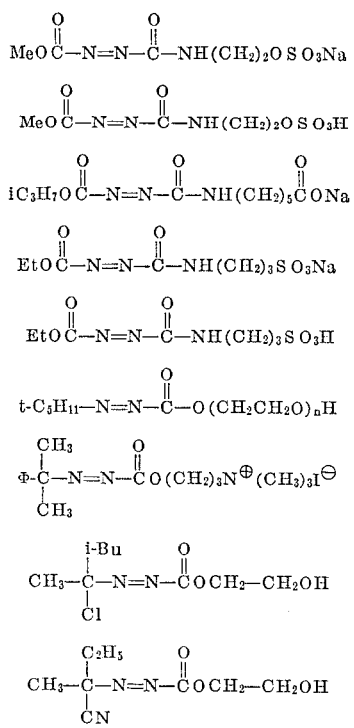

3.
$$MeO\overset{O}{\underset{\|}{C}}-N=N-\overset{O}{\underset{\|}{C}}-NH(CH_2)_2OSO_3Na$$

4.
$$MeO\overset{O}{\underset{\|}{C}}-N=N-\overset{O}{\underset{\|}{C}}-NH(CH_2)_2OSO_3H$$

5.
$$iC_3H_7O\overset{O}{\underset{\|}{C}}-N=N-\overset{O}{\underset{\|}{C}}-NH(CH_2)_5\overset{O}{\underset{\|}{C}}ONa$$

6.
$$EtO\overset{O}{\underset{\|}{C}}-N=N-\overset{O}{\underset{\|}{C}}-NH(CH_2)_3SO_3Na$$

7.
$$EtO\overset{O}{\underset{\|}{C}}-N=N-\overset{O}{\underset{\|}{C}}-NH(CH_2)_3SO_3H$$

8.
$$t-C_5H_{11}-N=N-\overset{O}{\underset{\|}{C}}-O(CH_2CH_2O)_nH$$

9.
$$\Phi-\underset{CH_3}{\overset{CH_3}{\underset{|}{\overset{|}{C}}}}-N=N-\overset{O}{\underset{\|}{C}}O(CH_2)_3N^{\oplus}(CH_3)_3I^{\ominus}$$

10.
$$CH_3-\underset{Cl}{\overset{i-Bu}{\underset{|}{\overset{|}{C}}}}-N=N-\overset{O}{\underset{\|}{C}}OCH_2-CH_2OH$$

11.
$$CH_3-\underset{CN}{\overset{C_2H_5}{\underset{|}{\overset{|}{C}}}}-N=N-\overset{O}{\underset{\|}{C}}OCH_2-CH_2OH$$

12.
$$CH_3-\underset{N_3}{\overset{i-Pr}{\underset{|}{\overset{|}{C}}}}-N=N-\overset{O}{\underset{\|}{C}}O(CH_2-CH_2O)_nH$$

13.
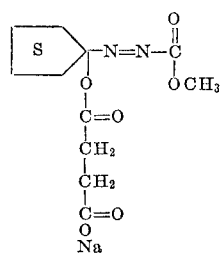

14.
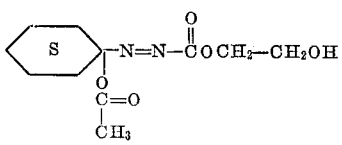

15.

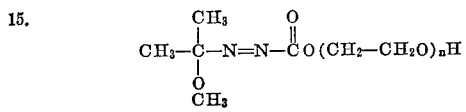

Compound 16-34 have a common structural formula:

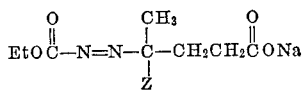

where Z is:

| | |
|---|---|
| 16. |  |
| 17. | H— |
| 18. | n—BuS— |
| 19. | HO— |
| 20. | N≡CO— |
| 21. | N≡CS— |
| 22. | Br— |
| 23. | HOO— |
| 24. | t—BuOO— |
| 25. |  |
| 26. |  |
| 27. |  |
| 28. |  |
| 29. |  |
| 30. |  |
| 31. |  |
| 32. |  |
| 33. |  |
| 34. |  |

Thus, having described the invention, what is claimed is:

1. An azoformate ester of the formula:

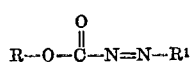

where:

(a) R is an alkyl radical having 1-6 carbons;

(b) 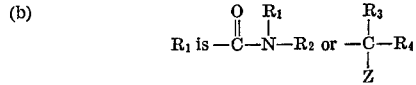

(c) at least one of R and $R^1$ contains a water solubilizing group selected from —OH, —$SO_3M$, —$OSO_3M$,

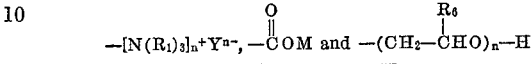

(d) M is alkali metal, $NH_4^+$ or $H^+$;
(e) Y is an n-valent inorganic acid anion;
(f) $R_1$, $R_2$ and $R_5$ are alkyl, alkenyl or alkynyl of 1-22 carbons; cycloalkyl or cycloalkenyl of 3-12 carbons; phenyl; biphenyl; or naphthyl; and $R_1$ and $R_2$ can also be H;
(g) $R_3$ and $R_4$ are alkyl, alkenyl or alkynyl of 1-22 carbons; cycloalkyl or cycloalkenyl of 3-12 carbons; and together can form an alkylene diradical of 4-5 carbons;
(h) $R_6$ is hydrogen or alkyl of 1-6 carbons;
(i) X is oxygen or sulfur;
(j) Z is —$R_1$, —$XR_1$, —CN, —XCN, —Cl, —Br, —OOH, —$OOR_3$, —$N_3$,

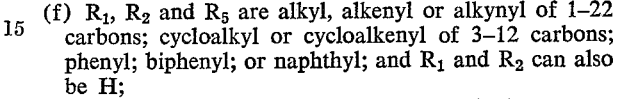

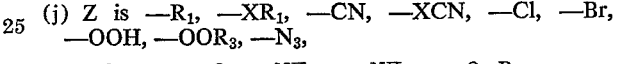

and
(k) n is 1-3.

2. Claim 1 where $R^1$ is

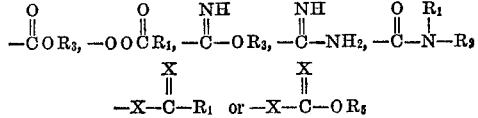

3.

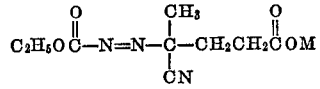

where M is alkali metal, $NH_4^+$ or $H^+$.

4.

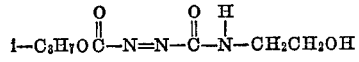

5.

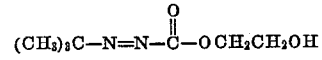

References Cited

UNITED STATES PATENTS

| 2,903,361 | 9/1959 | Marks et al. | 260—192 X |
|---|---|---|---|
| 3,282,912 | 11/1966 | Benzing | 260—192 X |
| 3,474,085 | 10/1969 | MacLeay et al. | 260—192 |
| 3,522,233 | 7/1970 | Sheppard et al. | 260—192 |

FLOYD D. HIGEL, Primary Examiner

U.S. Cl. X.R.

252—426; 260—29.6 R, 80 R, 86.1, 88.7 R, 91.5, 92.8 R, 92.8 W, 93.5 R